March 8, 1966 L. E. YOUNG, JR., ETAL 3,238,627
ADJUSTING MECHANISM
Filed Oct. 7, 1963 2 Sheets-Sheet 1

INVENTORS.
LOUIS E. YOUNG, JR. &
GERALD R. FROMENT
BY
Brumbaugh, Free, Graves + Donohue their ATTORNEYS March 8, 1966  L. E. YOUNG, JR., ETAL  3,238,627
ADJUSTING MECHANISM
Filed Oct. 7, 1963  2 Sheets-Sheet 2
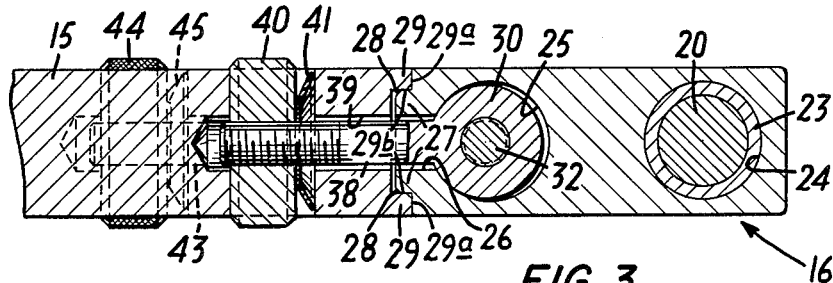
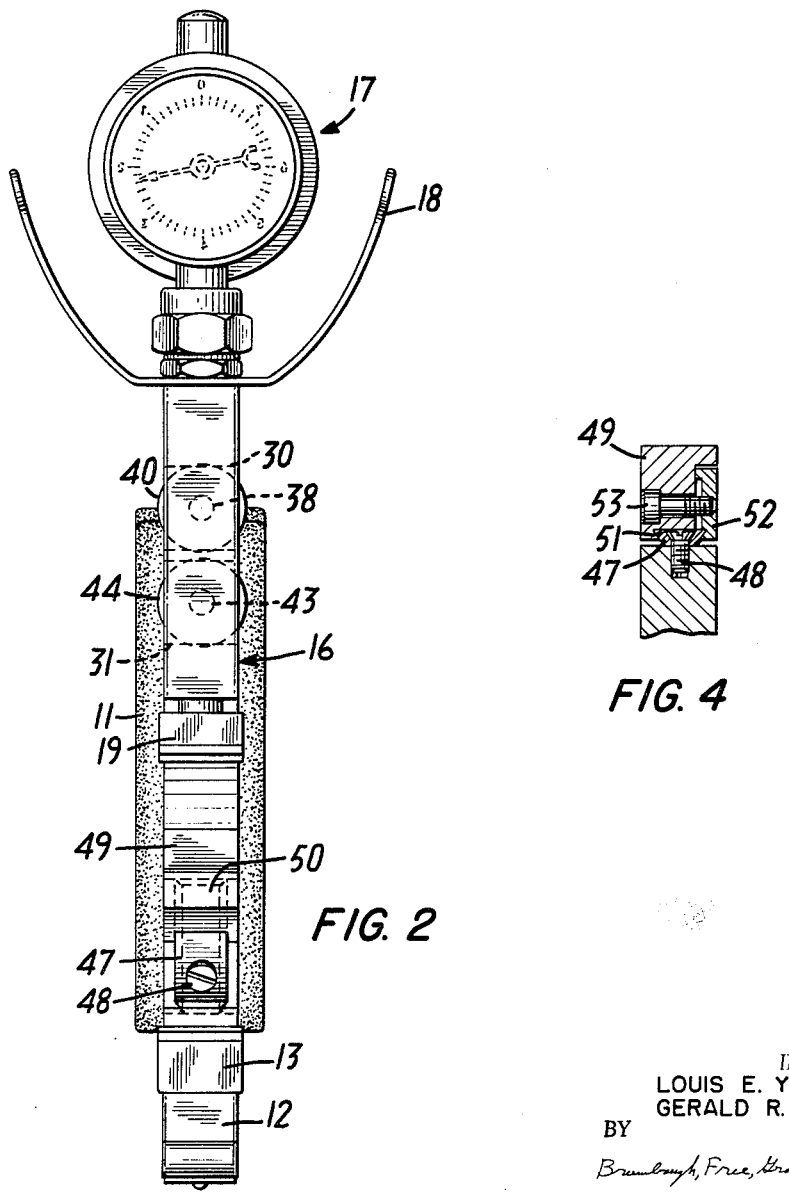
INVENTORS.
LOUIS E. YOUNG, JR. &
GERALD R. FROMENT
BY
their ATTORNEYS

United States Patent Office 3,238,627
Patented Mar. 8, 1966

3,238,627
ADJUSTING MECHANISM
Louis E. Young, Jr., North Swansea, Mass., and Gerald R. Froment, East Providence, R.I., assignors to Federal Products Corporation, Providence, R.I., a corporation of Rhode Island
Filed Oct. 7, 1963, Ser. No. 314,171
8 Claims. (Cl. 33—147)

This invention relates to an adjusting mechanism, and more particularly, a mechanism for adjusting with high precision the relative position of two bodies, means being provided for releasably locking the two bodies in any desired relative position. The invention can be used widely in the machine tool field, for example, for effecting adjustment of a tool element on a foundation or bed. The invention can also be applied to the gage art to provide an improved adjustable gage.

The present invention has for an object the provision of an improved adjusting mechanism by means of which the relative position of two bodies can be adjusted with high precision and can be releasably locked in any desired relative position.

Another object of the invention is to provide an adjusting mechanism of this general character wherein the movement of one body with respect to the other is highly linear.

Still another object of the invention is to provide an adjustable gage for quickly indicating with a high degree of accuracy the amount by which a linear dimension of an object differs from a standard or reference value.

A further object of the invention is to provide a gage wherein the faces of the two contact members of the gage are maintained in parallelism at all times and wherein those faces are also, at all times, at right angles to the axis of movement of the movable contact member of the gage. The invention, moreover, contemplates that the axis of movement of the movable contact member is also, and at all times, aligned with the axis of the lower contact member.

With these two conditions satisfied, assurance may be had that the operation of the gage will always be such as to furnish accurate measurements of the amount by which the distance between the outer surfaces of objects differs from that desired.

These and other objects are attained by a mechanism for adjusting with high precision the position of one body along a highly linear path with respect to another body, provision being made to secure the bodies in any desired relative position. In the illustrative embodiment of the invention, this adjusting mechanism is incorporated in an improved form of gage wherein a movable contact member is the member that actuates directly the gage indicating mechanism. The assembly containing the movable contact member and the indicating mechanism is mounted on the gage frame by the adjusting mechanism, whereby objects of different diameter may be accurately measured by a simple but effective form of adjustment which, in its adjusted and secured position, insures that the movable contact member and its related elements always satisfy the two requirements hereinabove mentioned.

In order that the invention may be described more fully, reference will be made to the accompanying drawings, illustrating the adjusting mechanism incorporated in an adjustable indicating gage, wherein:

FIG. 2 is a view in front elevation showing the gage of FIG. 1;

Figure 1:
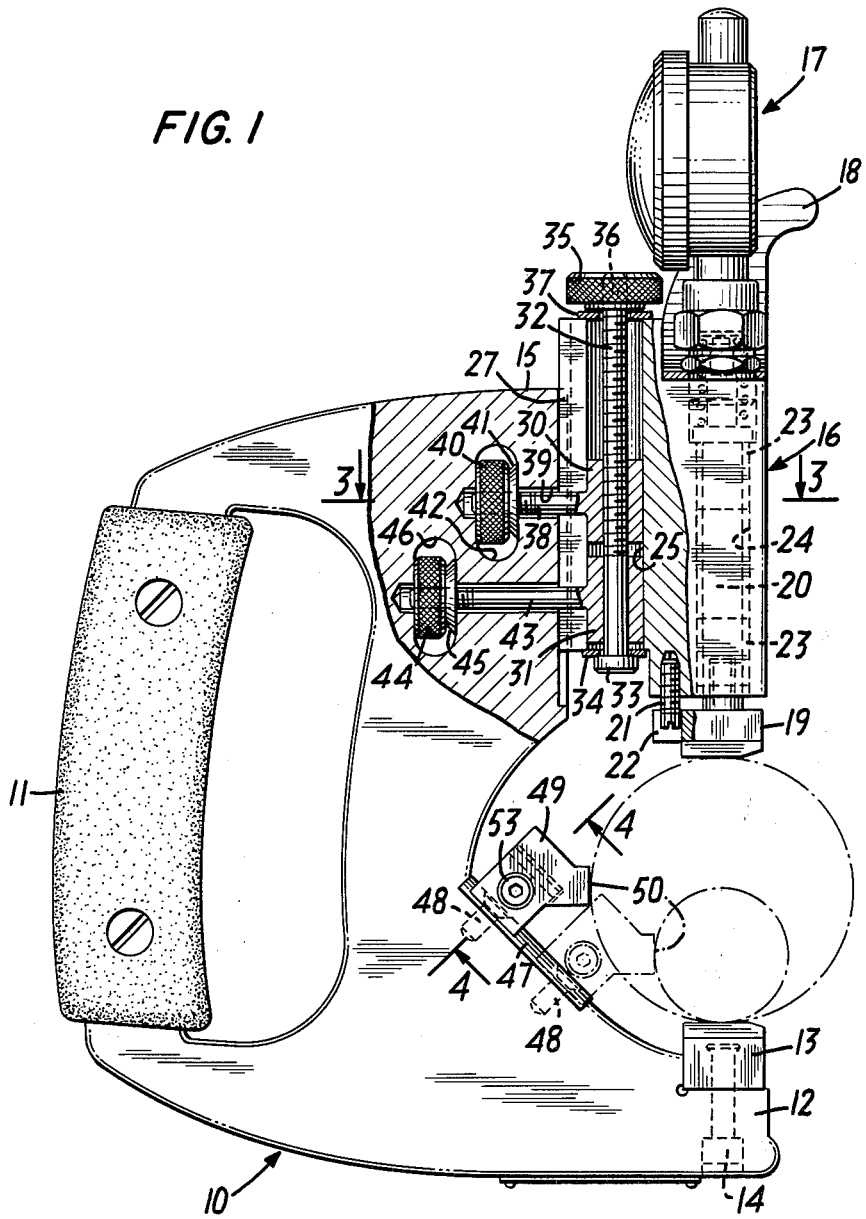
FIG. 1 is a view in side elevation, partly broken away and in section, showing the movable contact member and its related elements by means of which it is secured to the main gage frame.

FIG. 3 is a view in horizontal section taken in a plane indicated by the line 3—3 of FIG. 1 and looking in the direction of the arrows; and FIG. 4 is a partial view in section, taken on the plane indicated by the line 4—4 of FIG. 1 and looking in the direction of the arrows. This view illustrates a backstop structure that is simple in adjustment and effective in connection with measuring objects of different diameters.

Referring to the above drawings, the main frame of a gage is illustrated at 10 and is provided with a handle 11 of suitable form and preferably of thermally nonconductive material, the gage generally being of C-shape and having a lower extremity 12 upon which a stationary anvil or contact member 13 is secured. The stationary contact member is secured in position by means of a screw 14, thereby permitting replacement of this contact member when its engaging surface becomes worn.

The upper portion 15 of the gage frame carries an upper movable contact assembly 16 upon which a gage indicator 17 is mounted in a conventional way. A generally U-shaped protective guard 18 may be provided in order that the indicator 17 may not be injured inadvertently when the gage is set aside. The indicator 17 is actuated by a movable contact 19 which is mounted at the bottom of the assembly 16 and is connected directly by means of a suitable shaft 20 with the indicator, the movable contact 19 being maintained against rotation by means of a guide screw 21 which operates within a slot 22 formed within the movable contact member 19. The lower face of the movable contact 19 is a planar surface which is parallel to the plane formed by the upper face of the stationary contact member 13. Top and bottom spacing sleeves 23 serve to locate the shaft 20 within a cylindrical bore 24 that is formed within the movable assembly 16. Much of the foregoing structure follows generally conventional practice and is not a part of this invention.

In order that the movable assembly 16 may be adjustably positioned in any desired position within the range of permissible adjustment, the assembly 16 is secured to the gage frame 15 in the following manner:

Referring to FIGS. 1 and 3, the gage frame will be seen to be provided with a cylindrical bore 25 (FIG. 3), the bore being formed with a slot 26 and terminating with spaced ribs 27 forming a tongue. If desired, the outer edges of the ribs may be chamfered as at 28, and these ribs are adapted to be received within a mating groove formed within the adjacent vertical face of the gage frame 15, the groove being formed by spaced ribs 29. The top faces 29a of the ribs 29 normally abut the assembly 16 adjacent the ribs 27. Thus contact is made between the movable assembly 16 and the gage frame 15 along the top faces 29a and the internal side faces 29b of the ribs 29. It will be apparent, of course, that the machining of the ribs 27 and the ribs 29 is extremely important, for the accuracy of measurements afforded by the gage depends upon the accuracy in the dimensioning and shaping of these elements.

The movable assembly 16 is secured to the gage frame 15 in the following fashion. Within the bore 25 two sleeves 30 and 31 are received. The sleeve 30 is internally threaded and is engaged by a screw 32 which passes axially through the entire length of the bore 25. At its lower end, the screw 32 terminates in a head 33 which bears against a washer 34 engaging the lower side of the assembly 16. The upper end of the screw 32 has secured to it a knurled knob 35 (as, for example, by means of a pin 36), and the knurled knob engages a stationary disk or washer 37. Thus it will be seen that the screw 32 does not move axially in the bore 25 but is only permitted to turn. The screw 32 is slidably received within the lower sleeve 31 and is not threaded therein, whereas it is threaded to the upper sleeve 30.

The upper sleeve 30 is formed with a shank 38 which is received within a horizontal bore 39 formed within the frame of the gage, and the outer extremity of this shank is threaded and receives a knurled nut 40 and friction washer 41. A transverse opening 42 is formed within the gage frame in order that the knurled nut 40 and washer 41 may be received therein.

The lower sleeve 31 is likewise formed with a shank 43 having a knurled nut 44 and washer 45 received within an opening 46 within the frame of the gage and, in this fashion, the ribs 27 are located within the ribs 29 and secured in any desired position therein. Adjustment of the assembly is accomplished by loosening the knurled nuts 40 and 44 and then turning the knurled knob 35. This causes the screw 32 to turn and its position in the upper sleeve 30 to be adjusted. With the screw 32 the adjustment of the assembly 16 is accomplished and, when the assembly is in the desired position, both of the knurled nuts 40 and 44 are tightened. This operation causes the sleeves 30 and 31 to be drawn to the left, as viewed in FIG. 3 (the amount of clearance between the sleeve 30 and the bore 25 being exaggerated for purpose of illustration), and the leftward pull of these sleeves tends to expand the ribs 27 in vertical directions, as viewed in FIG. 3; in other words, the expansive forces are horizontally directed when the gage is in the erect position illustrated in FIG. 1. The ribs 27 are thus forced into locking engagement with the ribs 29 by expanding the ribs 27 outwardly against the internal side faces 29b of the ribs 29 while forcing the movable assembly 16 against the top faces 29a of the ribs 29. The flexibility provided in the adjacent portions of the movable assembly 16 permits of this limited expansion and, as a result, the movable assembly is effectively locked in any desired position with complete assurance that it is vertically positioned accurately in order that the gage may accomplish its intended purpose. The opposed faces of the stationary and movable contact elements are perpendicular to the axis of movement of the movable contact assembly 16 and remain so disposed for all adjusted positions of the assembly 16, due to the above-described novel means for adjustably securing it to the gage frame 15.

In order that objects of varying sizes may be effectively located between the stationary and movable contact elements so that they may be accurately measured, a backstop structure is provided, as illustrated in FIGS. 1 and 4. The lower portion of the gage frame is provided with a male dovetailed rib 47 which is secured in position by means of two screws 48. A backstop 49 is formed with a flat stop surface 50 that is located so that it is always parallel to the axis of movement of the assembly 16. The backstop 49 is formed with a dovetailed groove 51 and is provided with a mating adjustable plate 52 which is secured to the backstop by means of a screw 53. In this fashion the backstop may be adjusted, as illustrated in FIG. 1, to enable objects of different sizes to be located in a desired measuring position.

It is to be understood that the main gage frame 10 and the movable assembly 16 may represent any two objects whose relative position is to be accurately adjusted, the invention permitting the two objects to be releasably locked in any desired relative position. Furthermore, the invention insures that the relative movement of the two objects is highly linear.

The invention will be more precisely ascertained in the appended claims.

We claim:

1. An adjusting mechanism for adjusting the relative position of a first and a second body comprising first spaced parallel ribs on the first body having top faces and internal side faces, the top faces and the internal side faces having planar surfaces, second spaced parallel ribs on the second body adapted to be received within the first ribs, and means to secure the second body to the first body by expanding the second ribs outwardly against the internal side faces of the first ribs while forcing the second body against the top faces of the first ribs, the second body being forced against the top faces of the first ribs independently of the expansion of the second ribs outwardly against the internal side faces of the first ribs.

2. An adjusting mechanism for adjusting the relative position of a first and a second body comprising first spaced parallel ribs on the first body having top faces and internal side faces, the top faces and the internal side faces having planar surfaces, second spaced parallel ribs on the second body adapted to be received within the first ribs, a bore in the second body which communicates with the second ribs and whose axis is parallel with the planes of the top faces and the internal side faces of the first ribs, at least one sleeve slidably received in the bore, a shank integrally formed with each sleeve and extending substantially perpendicularly of the axis of the bore, and adjustable means in the first body cooperating with the shank to urge the sleeve against the second ribs, whereby the second ribs are releasably secured within the first ribs by expanding the second ribs outwardly against the internal side faces of the first ribs while forcing the second body against the top faces of the first ribs.

3. The adjusting mechanism of claim 2 wherein the shank is threaded and the adjustable means comprises nuts which threadedly engage the shank and which are so mounted in the first body to permit only rotational movement therein.

4. The adjusting mechanism of claim 2 including at least one bore in the first body for receiving the shank and a threaded adjusting screw which threadedly engages one sleeve and which is so mounted in the second body to permit only rotational movement therein.

5. An adjustable gage comprising a gage frame, a stationary contact element having a plane contact face, a movable contact assembly, a movable contact element having a plane contact face parallel to the plane of the face of the stationary contact element and mounted upon the movable contact assembly, indicating means on the movable contact assembly actuated by the movable contact element, first spaced parallel ribs on the frame having top faces and internal side faces perpendicular to the planes of the faces of the contact elements, second spaced parallel ribs on the movable contact assembly adapted to be received within the first ribs, and means to secure the movable contact assembly to the frame by expanding the second ribs outwardly against the internal side faces of the first ribs while forcing the movable contact assembly against the top faces of the first ribs, the movable contact assembly being forced against the top faces of the first ribs independently of the expansion of the second ribs outwardly against the internal side faces of the first ribs.

6. An adjustable gage comprising a gage frame, a stationary contact element having a plane contact face, a movable contact assembly, a movable contact element having a plane contact face parallel to the plane of the face of the stationary contact element and mounted upon the movable contact assembly, indicating means on the movable contact assembly actuated by the movable contact element, first spaced parallel ribs on the frame having top faces and internal side faces perpendicular to the planes of the faces of the contact elements, second spaced parallel ribs on the movable contact assembly adapted to be received within the first ribs, a bore in the movable contact assembly which communicates with the second ribs and whose axis is perpendicular to the planes of the faces of the contact elements, at least one sleeve slidably received in the bore, a shank integrally formed with each sleeve and extending substantially perpendicularly of the axis of the bore, and adjustable means in the gage frame cooperating with the shank to urge the sleeve against the second ribs, whereby the second ribs are releasably secured within the first ribs by expanding the second ribs outwardly against the internal side faces of the first ribs while forcing the movable contact assembly against the top faces of the first ribs.

7. The adjustable gage of claim 6 wherein the shank is threaded and the adjustable means comprises nuts which threadedly engage the shank and which are so mounted in the gage frame to permit only rotational movement therein.

8. The adjustable gage of claim 6 including at least one bore in the gage frame for receiving the shank and a threaded adjusting screw which threadedly engages one sleeve and which is so mounted in the movable contact assembly to permit only rotational movement therein.

References Cited by the Examiner
UNITED STATES PATENTS

| | | | |
|---|---|---|---|
| 1,821,398 | 9/1931 | Simpson | 33—147 |
| 2,079,266 | 5/1937 | Vaver | 33—47 |

FOREIGN PATENTS 410,131　2/1925　Germany.

LOUIS R. PRINCE, *Primary Examiner.*

ISAAC LISANN, *Examiner.*